(12) United States Patent
Jeyapaul et al.

(10) Patent No.: US 10,817,369 B2
(45) Date of Patent: Oct. 27, 2020

(54) APPARATUS AND METHOD FOR INCREASING RESILIENCE TO FAULTS

(71) Applicant: ARM Limited, Cambridge (GB)

(72) Inventors: Reiley Jeyapaul, Haverhill (GB); Balaji Venu, Cambridge (GB); Xabier Iturbe, Cambridge (GB); Emre Özer, Buckden (GB); Antony John Penton, Little Canfield (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 16/225,523

(22) Filed: Dec. 19, 2018

(65) Prior Publication Data

US 2019/0121689 A1    Apr. 25, 2019

Related U.S. Application Data

(63) Continuation-in-part of application No. 15/493,609, filed on Apr. 21, 2017, now Pat. No. 10,289,332.

(51) Int. Cl.
| | |
|---|---|
| *G06F 11/10* | (2006.01) |
| *G06F 3/06* | (2006.01) |
| *G06F 11/07* | (2006.01) |

(52) U.S. Cl.
CPC ........ *G06F 11/1048* (2013.01); *G06F 3/0619* (2013.01); *G06F 3/0653* (2013.01); *G06F 3/0679* (2013.01); *G06F 11/0727* (2013.01); *G06F 11/1044* (2013.01)

(58) Field of Classification Search
CPC ............. G06F 11/1044; G06F 11/1048; G06F 11/1076; G06F 11/0727; G06F 3/0619; G06F 3/061; G06F 3/0673; G06F 3/0634; G06F 9/467; G06F 9/524; G06F 9/30043
See application file for complete search history.

(56) References Cited

U.S. PATENT DOCUMENTS

| | | | |
|---|---|---|---|
| 7,178,062 B1 | 2/2007 | Dice | |
| 7,610,475 B2 | 10/2009 | Arnold et al. | |
| 8,417,987 B1* | 4/2013 | Goel | ........... G06F 11/1076 714/6.1 |
| 8,732,523 B2* | 5/2014 | Ozer | ........... G06F 11/0727 714/20 |
| 2011/0173482 A1* | 7/2011 | Penton | ........... G06F 11/1641 714/2 |

(Continued)

OTHER PUBLICATIONS

U.S. Appl. No. 15/493,609, filed Apr. 21, 2017, Inventor: Iturbe et al.

(Continued)

*Primary Examiner* — Shelly A Chase
(74) *Attorney, Agent, or Firm* — Nixon & Vanderhye P.C.

(57) ABSTRACT

Aspects of the present disclosure relate to an apparatus comprising processing circuitry to execute a plurality of code sequences, and configuration storage to store mode control data for the processing circuitry. When the processing circuitry is executing one of said plurality of code sequences, the mode control data is set so as to identify a high resilience mode of operation of the processing circuitry where usage of one or more components of the processing circuitry is modified so as to increase resilience of the processing circuitry to faults relative to a default mode of operation of the processing circuitry.

19 Claims, 10 Drawing Sheets

(56) References Cited

U.S. PATENT DOCUMENTS

2015/0212911 A1\* 7/2015 Nolterieke .............. G06F 3/061
 714/6.23
2017/0371578 A1 12/2017 Wu et al.

OTHER PUBLICATIONS

Office Action dated Jul. 3, 2018 in co-pending U.S. Appl. No. 15/493,609 9 pages.

\* cited by examiner

APPARATUS AND METHOD FOR INCREASING RESILIENCE TO FAULTS

This application is a continuation-in-part of U.S. Application No. 15/493,609 filed 21 Apr. 2017, the entire contents of which is hereby incorporated by reference.

BACKGROUND

The present technique relates to an apparatus and method for increasing resilience to faults.

Due to the environments in which data processing systems may operate, components within the data processing system can exhibit faults, and the presence of these faults may result in errors being detected during performance of data processing operations by the data processing system. The faults may for example be caused by radiation or other external events. Considering the example of a storage element, such radiation may result in a particle strike on a bitcell or flip-flop, which can cause a single event upset (SEU) where a single bit of a stored value changes state. Hence, the storage element exhibits a fault, and this can then give rise to an error being detected when the processing circuitry processes data that includes the bit stored in the faulty storage element.

When such errors are detected, dealing with such errors can consume significant processing time and resources, and in some instances it may not be possible to correct the error, which can result in a failure of the system. This may then require even more invasive procedures such as a full system reboot, thereby significantly impacting system availability.

Accordingly, it would be desirable to provide a technique which enabled a system's vulnerability to faults to be reduced.

SUMMARY

In one example arrangement, there is provided an apparatus comprising: processing circuitry to execute a plurality of code sequences; and configuration storage to store mode control data for the processing circuitry; wherein when the processing circuitry is executing one of said plurality of code sequences, the mode control data is set so as to identify a high resilience mode of operation of the processing circuitry where usage of one or more components of the processing circuitry is modified so as to increase resilience of the processing circuitry to faults relative to a default mode of operation of the processing circuitry.

In a further example arrangement, there is provided a method of increasing resilience to faults within an apparatus having processing circuitry for executing a plurality of code sequences, the method comprising: storing in configuration storage mode control data for the processing circuitry; during execution by the processing circuitry one of said plurality of code sequences, setting the mode control data to identify a high resilience mode of operation of the processing circuitry; and in the high resilience mode of operation, modifying usage of one or more components of the processing circuitry so as to increase resilience of the processing circuitry to faults relative to a default mode of operation of the processing circuitry.

In a further example arrangement, there is provided an apparatus comprising: processing means for executing a plurality of code sequences including at least one critical code sequence; and configuration storage means for storing mode control data for the processing means; when the processing means is executing one of said plurality of at least one critical code sequences, the mode control data is set so as to identify a high resilience mode of operation of the processing means where usage of one or more components of the processing means is modified so as to increase resilience of the processing means to faults relative to a default mode of operation of the processing means.

In a further example arrangement, there is provided an apparatus comprising: processing circuitry to execute a plurality of code sequences including at least one critical code sequence; and configuration storage to store mode control data for the processing circuitry; when the processing circuitry is executing said at least one critical code sequence, the mode control data is set so as to identify a high resilience mode of operation of the processing circuitry where usage of one or more components of the processing circuitry is modified so as to increase resilience of the processing circuitry to faults relative to a default mode of operation of the processing circuitry.

In a further example arrangement, there is provided a method of increasing resilience to faults within an apparatus having processing circuitry for executing a plurality of code sequences including at least one critical code sequence, the method comprising: storing in configuration storage mode control data for the processing circuitry; when the processing circuitry is executing said at least one critical code sequence, setting the mode control data to identify a high resilience mode of operation of the processing circuitry; and in the high resilience mode of operation, modifying usage of one or more components of the processing circuitry so as to increase resilience of the processing circuitry to faults relative to a default mode of operation of the processing circuitry.

In a yet further example arrangement, there is provided an apparatus comprising: processing means for executing a plurality of code sequences including at least one critical code sequence; and configuration storage means for storing mode control data for the processing means; when the processing means is executing said at least one critical code sequence, the mode control data is set so as to identify a high resilience mode of operation of the processing means where usage of one or more components of the processing means is modified so as to increase resilience of the processing means to faults relative to a default mode of operation of the processing means.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
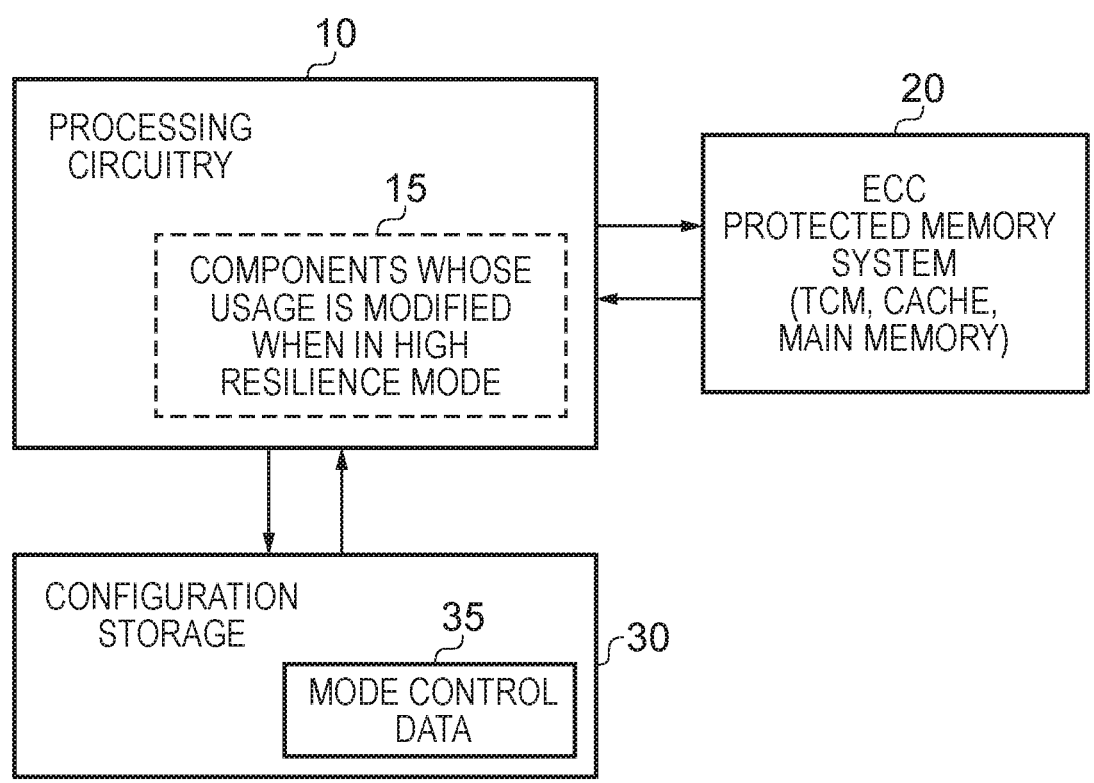
FIG. 1 is a block diagram illustrating an apparatus in accordance with one embodiment.

Before discussing the embodiments with reference to the accompanying figures, the following description of embodiments is provided.

In accordance with the described embodiments, a high resilience mode of operation is provided for processing circuitry, and that high resilience mode of operation can be selected when executing particular code sequences considered to be critical code sequences. The code sequences considered to be critical code sequences will vary dependent on particular implementations, but generally are those code sequences where it is particularly desirable to reduce the chance of errors being detected whilst executing those code sequences.

As mentioned earlier, one source of such errors can be faults that occur within the processing circuitry due, for example, to radiation or other external events interacting with the processing circuitry. In accordance with the described embodiments, a high resilience mode of operation of the processing circuitry is provided where usage of one or more components of the processing circuitry is modified so as to increase resilience of the processing circuitry to faults relative to a default mode of operation of the processing circuitry. Whilst it is the case that in the high resilience mode of operation the processing circuitry will still be subjected to the same external influences that can give rise to faults, due to the way in which the usage of one or more of the components is modified the chance of such faults giving rise to an error during the performance of processing operations by the processing circuitry is reduced. As a result, the processing circuitry has increased resilience to such faults whilst in the high resilience mode of operation by reducing the processing circuitry's vulnerability to such faults giving rise to errors.

It has further been found that in many situations it is possible for the critical code sequence to be executed by the processing circuitry whilst in the high resilience mode of operation without a significant adverse effect on performance. This hence provides a highly effective and efficient mechanism for making the processing circuitry more robust against the effects of faults whilst executing certain critical code sequences, which can lead to significantly improved availability of the system by reducing the occurrence of errors whilst executing those critical code sequences.

The components of the processing circuitry whose usage is modified in the high resilience mode of operation can take a variety of forms. In one embodiment, the processing circuitry comprises a first subset of components required for correct execution of instructions of each code sequence, and a second subset of components whose usage is unnecessary for correct execution of said instructions. The one or more components whose usage is modified when the processing circuitry is in the high resilience mode may then comprise components within the second subset.

The components within the second subset can take a variety of forms but in one embodiment include at least some components that are provided to seek to improve performance of the processing circuitry. In modem data processing systems, in addition to the core components required to perform the processing operations defined by the instructions being executed, a number of additional structures will typically be provided within the processing circuitry to seek to improve the overall throughput of the processing circuitry. These can include, for example, certain queue or buffer structures used to ensure that the core processing components are provided with a steady stream of processing operations to perform, and hence spend less time idle, and can include components such as branch prediction circuitry to predict the program flow, with the aim of ensuring that the required instructions are fetched from memory ahead of time in order to alleviate the performance impact that might otherwise arise when there are changes in instruction flow. Any of the above types of components that are not strictly necessary for correct execution of the instructions may be candidates for having their usage modified when in the high resilience mode of operation, so as to seek to increase the processing circuitry's overall resilience to faults.

The way in which the usage of such components is modified can also vary dependent on embodiment, but in one embodiment comprises steps such as bypassing the component, decreasing an extent to which the component is used and/or disabling the component. By taking such measures, then if a fault occurs within that component, the chances of that fault manifesting itself as an error within the processing being performed by the processing circuitry is significantly reduced, thereby increasing the processing circuitry's overall resilience to faults when in the high resilience mode of operation.

In one embodiment, the processing circuitry comprises fetch circuitry to fetch the instructions of each code sequence from a memory system prior to execution of those instructions, the memory system employing an error detection scheme. When in the high resilience mode of operation, usage of the fetch circuitry may be modified to cause the fetch circuitry to reduce a fetch rate relative to a fetch rate used when the processing circuitry is in the default mode of operation. Since the memory system employs an error detection scheme, the memory system will have some built-in resilience to faults affecting the individual components of the memory system. By reducing the fetch rate when in the high resilience mode of operation, the instructions (and optionally associated data) can be retained within the memory system for a longer period of time, reducing the amount of time those instructions (and associated data) spend within the processing circuitry itself, and hence reducing the likelihood that faults will occur during the period of time that such instructions are being processed by the processing circuitry.

This approach is particularly beneficial for critical code sequences of the type where a reduction in the fetch rate does not have any significant adverse impact on the overall performance of the processing circuitry when executing that critical code sequence. It has been found that many critical code sequences involve significant numbers of data load and store operations to memory that consume a significant proportion of the time taken to perform the processing operations required by the critical code sequence, and hence the reduced instruction fetch rate has a relatively minor effect on performance. Further, it is often the case that such critical code sequences contain relatively few branch instructions, and hence relatively few changes in instruction flow, and therefore significant buffering of instructions to smooth out the instruction flow are not needed in order to keep the processing pipeline full. As a result, a reduction in the fetch rate for such types of code sequences does not have a significant impact in performance, and accordingly significant fault resilience benefits can arise from keeping the instructions in the memory system for as long as possible.

There are a number of ways in which the fetch rate of the fetch circuitry can be altered during the high resilience mode of operation. In one embodiment, a control signal may be issued directly to the fetch circuitry to specify the required reduction in fetch rate. However, in an alternative embodiment modifications to the usage of one or more structures within the processing circuitry may themselves influence the fetch rate employed by the fetch circuitry. For example, in one embodiment the one or more components may comprise at least one buffer structure used to buffer information derived from the fetched instructions prior to execution of the instructions. When in the high resilience mode of operation, the usage of said at least one buffer structure may be modified to reduce an effective size of the at least one buffer structure relative to the effective size when in the default mode of operation, to thereby reduce the fetch rate of the fetch circuitry. By reducing the effective size of one or more buffer structures, those buffer structures are more likely to become full, and when those buffer structures are full, this will naturally throttle the fetch rate used by the fetch circuitry, since the fetch circuitry can only fetch instructions when there is space within those buffer structures to receive the information derived from those instructions.

There are a number of ways in which the usage of the one or more components can be modified when the processing circuitry is operating in the high resilience mode of operation, but in one embodiment the modification in the usage of such components takes into account at least one characteristic of the critical code sequence, such that an impact on performance of the processing circuitry when executing the critical code sequence in the high resilience mode of operation is less than a first threshold. Hence, consideration is given to the characteristics of the critical code sequence when deciding how to change the usage of one or more components, with the aim of ensuring that such modifications in the usage do not have an undue impact on the performance of the processing circuitry when executing the critical code sequence in the high resilience mode of operation.

This impact can be assessed in a variety of ways. For example, it can be an assessment relative to the performance of the processing circuitry when executing the critical code sequence in the default mode of operation. Alternatively, the first threshold can be assessed relative to execution of other non-critical code sequences in the high resilience mode of operation. Hence, whilst operation in the high resilience mode of operation could have a significant impact on performance for certain code sequences if those code sequences were to be executed in the high resilience mode of operation, the manner in which the usage of the components is modified is such that the impact on performance for the one or more critical code sequences is significantly less. This means that the one or more critical code sequences can be executed in the high resilience mode of operation in order to benefit from the increased resilience to faults available when operating in that mode of operation, whilst the remaining code is executed whilst the processing circuitry is in the default mode of operation, so as to avoid the performance impact that would arise if all of the code sequences were executed in the high resilience mode of operation.

The characteristics of the critical code sequence that are taken into account when deciding how to modify the usage of the one or more components can take a variety of forms, but in one embodiment comprise at least one of: a proportion of memory access instructions above a second threshold; a proportion of branch instructions below a third threshold; such that a reduction in a fetch rate of instructions by fetch circuitry of the processing circuitry has an impact on performance less than the first threshold. Hence, in this particular example, characteristics of the critical code sequence that imply that a reduction in fetch rate will not significantly impact performance are considered when identifying suitable critical code sequences to be executed in the high resilience mode of operation.

In one embodiment, the manner in which a critical code sequence and/or its associated data are stored within the memory system can be chosen so as to reduce latency involved in accessing the critical code sequence's instructions and/or data by the processing circuitry. In particular, in one embodiment the memory system may comprise a first memory within which the critical code sequence and/or data used by the critical code sequence is stored, the processing circuitry being arranged, when executing the critical code sequence, to directly access the first memory bypassing at least one cache memory of the memory system, said at least one cache memory including one or more components unprotected by the error detection scheme. By providing the critical code sequence and/or its data within the first memory, and then avoiding the need to access one or more cache levels of memory when accessing those instructions and/or data, this can further reduce the time that such instructions and data spend outside of the protected part of the memory system (as mentioned earlier the memory system typically employing an error detection scheme). This can further improve the resilience to faults.

The first memory can take a variety of forms, but in one embodiment is a tightly coupled memory (TCM).

In one embodiment, the processing circuitry may include data access buffer circuitry to buffer data access operations to be performed within the memory system. Such a data access buffer may for example be a store buffer used to store pending store operations prior to those store operations being performed by the memory system. In one embodiment, when in the high resilience mode of operation, the usage of the data access buffer circuitry is modified to reduce a latency of the data access buffer circuitry relative to its latency when in the default mode of operation. By reducing the latency of the data access buffer circuitry, this reduces the amount of time that pending data access operations are retained within the data access buffer circuitry, and hence reduces the exposure to errors that could occur due to faults arising within components of the data access buffer circuitry.

There are a number of ways in which the latency may be reduced, but in one embodiment the latency is reduced by reducing an effective size of the data access buffer circuitry relative to the effective size within the default mode of operation. By reducing the total number of data access operations that can be pending within the data access buffer circuitry, this causes individual data access operations to spend less time buffered within the buffer circuitry, thus increasing resilience to faults.

When the effective size is reduced in such a way, it will be appreciated that there will then be certain entries within the physical data access buffer circuitry that are not used whilst the processing circuitry is operating in the high resilience mode of operation, and hence any faults that arise within those unused entries cannot give rise to an error when handling the pending data access operations, since none of the pending data access operations will utilise such entries. This further improves the resilience of the processing circuitry to faults.

The critical code sequence can take a variety of forms, but in one embodiment is a memory scrubbing routine executed to read content from the memory system, correct any identified faults that are correctable in accordance with the error detection scheme, and then rewrite the content back to the memory system, thereby seeking to prevent accumulation of faults within the memory system. By arranging the processing circuitry to execute the memory scrubbing routine whilst in the high resilience mode of operation, this reduces the probability of memory corruption occurring whilst executing memory scrubbing operations.

As mentioned earlier, the memory system will typically employ an error detection scheme, and in one embodiment that error detection scheme may be an error correction code (ECC) scheme. Hence, during performance of the memory scrubbing routine, the processing circuitry can use the ECC information associated with the various data values retrieved from memory in order to detect, and then seek to correct, any errors arising due to the identified faults. It is useful to perform the memory scrubbing routine periodically, as this increases the chance that errors in the data will be identified whilst it is still possible to correct those errors. By executing the memory scrubbing routine whilst the processing circuitry is in the high resilience mode of operation, this reduces the chance that faults within the processing circuitry itself could introduce errors into the data being scrubbed, and hence reduces the probability of memory corruption.

As another example of a suitable critical code sequence to which the techniques of the described embodiments could be applied, the critical code sequence may be a check-pointing routine executed to save to the memory system architectural state of a program being executed by the processing circuitry, to allow rollback to that saved architectural state on detection of an error within the processing circuitry. When performing the check-pointing routine, it is highly desirable to reduce the likelihood that faults occurring within the processing circuitry could produce errors in the saved architectural state, as in that instance the saved architectural state does not provide a reliable architectural state to rollback processing to in due course if an error is detected within the processing circuitry. Instead, it would be necessary to rollback to an earlier version of the saved architectural state, hence significantly impacting performance.

In one particular embodiment, the operation of the check-pointing routine as a critical code sequence is particularly beneficial when the apparatus contains multiple processing circuits that are arranged to operate in lockstep. In particular, the apparatus may further comprise at least one further processing circuit arranged to operate in lockstep with the processing circuitry to provide redundant processing of program instructions. The apparatus may for example be a dual-core lockstep processing apparatus where two processing circuits operate in lockstep to provide redundant processing of program instructions.

In such an arrangement, when performing the check-pointing routine, both the processing circuitry and the at least one further processing circuitry are placed in the high resilience mode of operation to reduce probability of an error being detected during performance of the check-pointing routine. In particular, due to the increased resilience to faults of both the processing circuitry and each further processing circuitry, there is a significantly reduced risk that a fault in one of the processing circuits will manifest itself in an error in the output signals of that processing circuit that indicate the saved architectural state. Hence, this reduces the likelihood of there being a difference in the output signals from the multiple processing circuits, where such a difference would be identified as indicating an error condition, and cause the saved architectural state to be considered unusable.

As used herein, the term lockstep does not necessarily mean that each processing circuit performs exactly the same processing in each clock cycle, and in some embodiments the different processing circuits can operate with a fixed temporal offset with respect to each other. However, each of the processing circuits will effectively execute the program instructions in synchronisation with each other so as to provide redundant processing of the program instructions.

In one embodiment, the apparatus may comprise at least two further processing circuitries arranged to operate in lockstep with the processing circuitry to perform redundant processing of program instructions. Error detection circuitry can then be used to detect a mismatch between signals on a corresponding signal node in the processing circuitry and the at least two further processing circuitries. Then, in response to detecting such a mismatch, the error detection circuitry may be configured to trigger a recovery routine for resolving an error detected for an erroneous processing circuitry using state information derived from at least two other processing circuitries. By providing at least three redundant processing circuits (rather than only two), this allows errors to be not only detected, but also corrected in situations where the majority of the processors are providing the same signals on their corresponding signal nodes. This allows forward progress to be made and previous processing results are not lost. This helps to reduce the time for which the system is unavailable following an error, which can be important for real-time operations.

However, when performing the recovery process it is possible that a further error could arise. This can compromise the success of the recovery process, and so if a further error is detected in such a situation, this may result in an unresolvable error being signalled. When an unresolvable error occurs, the recovery process may be halted and a more disruptive form of error handling may be used, e.g. a full system reboot, to avoid processing continuing based on potentially incorrect state information, but this will typically incur significantly increased error recovery time.

Accordingly, in one embodiment the recovery routine can be considered to be a critical code sequence that each of the processing circuits executes whilst in the high resilience mode of operation. As a result, this increases the resilience of each of the processing circuits to faults whilst executing the recovery process, and hence reduces the chance that any fault within one of the processing circuits will manifest itself in an error at the output of that processing circuit, thereby reducing the chance that there will be any further divergence in the outputs of the multiple processing circuits, and hence reducing the chance that non-recoverable errors will occur.

The one or more components whose usage is modified whilst the processing circuitry is in the high resilience mode of operation can take a variety of forms, but in one embodiment comprise one or more of: fetch circuitry; a prefetch buffer; an instruction queue; an issue queue; a store buffer; branch prediction circuitry; and/or debug circuitry.

Further embodiments will now be described. It will be appreciated that these embodiments can be implemented in combination with some of the embodiments described above.

As explained above, faults caused for example by charged particle radiation and electrical interference can cause failures in processing systems. An example of the present disclosure, by which such faults may be mitigated, comprises processing circuitry to execute a plurality of code sequences and configuration storage to store mode control data for the processing circuitry. The code sequences may, but not necessarily, include critical code sequences as described above.

When the processing circuitry is executing one of said plurality of code sequences, the mode control data can be set so as to identify a high resilience mode of operation of the processing circuitry where usage of one or more components of the processing circuitry is modified so as to increase resilience of the processing circuitry to faults relative to a default mode of operation of the processing circuitry. For example, the processing circuitry may be configured to enter the high resilience mode of operation responsive to determining that a protection condition has been met. The high resilience mode can thus be entered and exited based on present conditions, as described in more detail below. This behaviour may be fixed by the design of the circuitry or, alternatively, may be defined at run-time such that a hardware triggering mechanism can set the mode control data to increase the protection of the storage structures accessed. This provides improved performance relative to comparative systems in which the use of fault protection mechanisms, such as error correction codes, is defined at design time. For example, such a comparative system may be defined to use a fault protection mechanism for a cache structure, but not for microarchitecture storage structures; such a comparative system would be vulnerable to errors in the microarchitecture storage structures. Conversely, a comparative system in which the fault protection system is necessarily used in the microarchitecture storage structures could waste processing resources by implementing fault protection unnecessarily even under operating conditions with a low incidence of faults, or when the state of the program does not require high resilience during execution.

The presently described example provides improved performance relative to such comparative systems, by providing for the high resilience mode of operation to be entered and exited as appropriate, for example based on operating conditions, rather than being defined at design time.

As noted above, the processing circuitry may be configured to enter the high resilience mode of operation responsive to determining that a protection condition has been met. For example, the protection condition may be that a protection signal has been received. Such protection signals can thus be used to activate the high resilience mode when appropriate.

Another example of a protection condition is a failure rate condition, for example that a failure rate associated with at least one component of the processing circuitry has exceeded a threshold. For example, the failure rate can be a rate of exceptions signalled by the processing circuitry. Alternatively or additionally, the failure rate may take into account errors reported from error detection circuitry of the apparatus. This may for example be tracked by failure counting circuitry. The high resilience mode can thus be activated automatically to mitigate a determined high failure rate. The aforementioned threshold may be defined at design time, or may alternatively be selectable by a user. Furthermore, the particular failure types that are taken into account in the aforementioned failure rate may be selectable by the user.

In an example, the processing circuitry is coupled to a storage structure to, responsive to the processing circuitry entering the high resilience mode of operation, activate an error detection scheme. For example, the error detection scheme may be an error correction code (ECC) scheme. Such a scheme may comprise storing an error correction code for each of a plurality of stored items of the storage structure, from which it can be determined whether that stored item is correct or erroneous. Such a scheme may further comprise correcting or recovering from the detected fault.

Activating such an error detection scheme may comprise initiating determination of an error correcting code for each of the plurality of stored items. This may be performed for all stored items, or alternatively for newly-stored items as they are stored.

In examples, the storage structure is configured to, responsive to the processing circuitry leaving the high resilience mode of operation, deactivate the error detection scheme. This deactivation may comprise ceasing determination of error correcting codes for stored items of the storage structure.

The storage structure may be configured to, after the processing circuitry has exited the high resilience mode of operation, implement the error detection scheme in respect of stored items for which error detection codes are determined. For example, whilst generation of new error correction codes may cease, already-stored codes may still be used to check for errors in their corresponding stored items.

Alternatively, the storage structure may be configured to, responsive to the processing circuitry exiting the high resilience mode of operation, invalidate the determined error correction codes. Processing resource usage is thereby reduced, at the expense of reduced error detection.

Particular embodiments will now be described with reference to the Figures.

FIG. 1 is a block diagram of an apparatus in accordance with one embodiment. Processing circuitry 10 is provided for executing a plurality of code sequences. The instructions forming the code sequences, and the data manipulated when executing those instructions, may be stored in memory system 20, which in one embodiment is ECC protected. In particular, the storage structures within the memory system 20 may store ECC information in association with each data value stored. Accordingly, if a fault occurs within a storage element, for example due to a particle strike or other external event, and that manifests itself in a bit value flipping state, this error may be detected with reference to the associated ECC information, and may be correctable using the ECC information.

The memory system can take a variety of forms, and will typically include one or more levels of cache memory, and main memory. It may also include a tightly coupled memory (TCM) accessible to the processing circuitry.

The processing circuitry 10 will include a variety of components for performing the data processing operations specified by the instructions of the code sequences executed by the processing circuitry. For example, the processing circuitry will typically include a processing pipeline comprising multiple pipeline stages, these pipeline states including not only the execute stages used to perform the operations required by the instructions, but also associated fetch, decode and issue stages used to fetch the instructions from memory, decode them, and then issue them to the appropriate execution unit within the execute stages of the processing pipeline. In addition to the components required for correct execution of the instructions, there will typically be one or more other components provided to seek to improve the overall efficiency of the processing circuitry. These may include, for example, one or more buffer or queue structures for buffering information between various pipeline stages of the processing circuitry, and can also include components such as branch prediction circuitry used to predict changes in instruction flow, with the aim of ensuring that the correct instructions are fetched ahead of time by the processing circuitry. There will also be other components such as debug circuitry used to enable debugging operations to be performed within the processing circuitry.

The components of the processing circuitry are vulnerable to faults arising, for example due to external events such as radiation strikes. When a fault is introduced into a component, this can manifest itself in an error occurring within the processing operations being performed by the processing circuitry, due to the use of that faulty component. Whilst mechanisms may be provided to detect and then handle such errors, the handling of errors can significantly impact performance. Further, in some instances it may not be possible to undo the effect of the error, and a more robust intervention may be required, for example a full system reboot.

As shown in FIG. 1, configuration storage 30 is provided for storing various control information used to control the operation of the processing circuitry 10. In the embodiments described hereafter, the configuration storage 30 includes mode control data 35 which can be set to identify a high resilience mode of operation of the processing circuitry. When the mode control data 35 identifies the high resilience mode of operation, the usage of certain components 15 within the processing circuitry is modified in a manner that seeks to increase the resilience of the processing circuitry to faults relative to a default mode of operation of the processing circuitry. This modification in the usage can take a variety of forms, dependent on the component in question, but may involve bypassing that component, decreasing an extent to which that component is used, or disabling the component.

In one embodiment, the components whose usage is modified are chosen from amongst those components whose usage is not strictly necessary for correct execution of the instructions. Hence, the components that are required to perform the correct logical operations dictated by each of the instructions being executed do not have their usage modified, but some of the more peripheral components can have their usage modified with the aim of increasing resilience of the processing circuitry to faults. In one embodiment, the components whose usage is modified are components that are provided to seek to improve the overall performance of the processing circuitry, but not components required for correct operation. Various examples of the components whose usage can be modified will be discussed in more detail later with reference to FIGS. 3 and 4.

Figure 2:
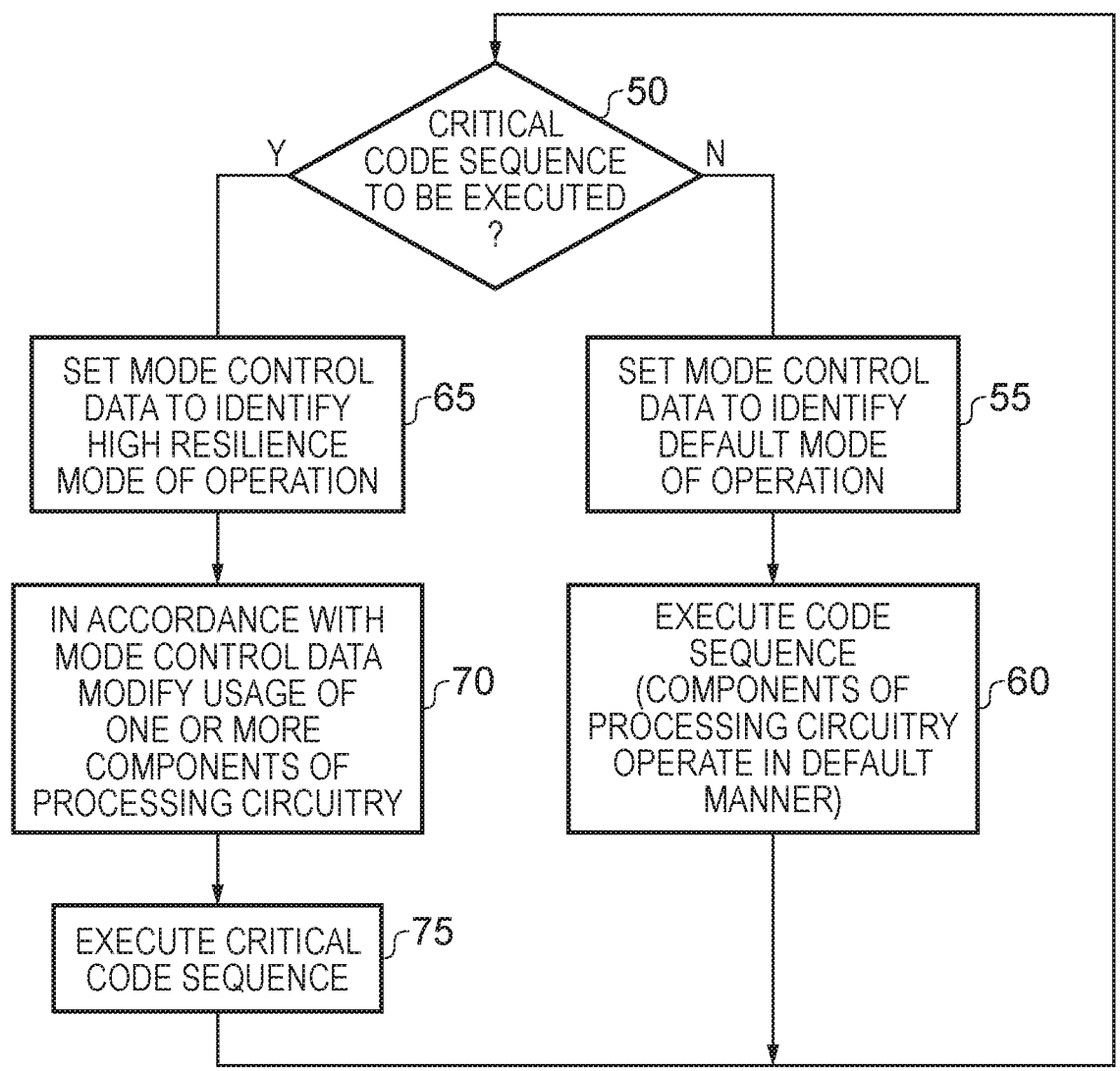
FIG. 2 is a flow diagram illustrating the operation of the apparatus of FIG. 1 in accordance with one embodiment.

FIG. 2 is a flow diagram illustrating the operation of the apparatus of FIG. 1 in accordance with one embodiment. At step 50, it is determined whether a critical code sequence is to be executed. If not, then the mode control data 35 is set at step 55 to identify a default mode of operation. Thereafter, at step 60 the code sequence is executed in the standard manner, with each of the components of the processing circuitry operating in their default manner. The process then returns to step 50.

If at step 50 it is determined that a critical code sequence is to be executed, then at step 65 the mode control data 35 is set to identify the high resilience mode of operation. Thereafter, at step 70, the usage of one or more components of the processing circuitry is modified in accordance with the mode control data, and at step 75 the critical code sequence is executed.

Whilst in one embodiment the processing circuitry is still just as susceptible to external events such as radiation particle strikes, and hence components within the processing circuitry may still exhibit faults due to those particle strikes, due to the way in which the usage of certain components is modified the processing circuitry is less susceptible to those faults introducing errors into the processing operations performed by the processing circuitry when the processing circuitry is operating in the high resilience mode of operation. Hence, when executing the critical code sequences, there is a reduced risk of errors occurring.

The mode control data 35 can take a variety of forms. For example, it may be a single bit used to identify the high resilience mode of operation or the default mode of operation. The value of that mode control bit is then used to direct the individual control signals sent to various components within the processing circuitry, so as to selectively alter the behaviour of those components. Alternatively, the mode control data 35 may itself comprise a number of fields, with each of the individual fields being used to produce control signals for individual components within the processing circuitry.

In another variant, more than one form of high resilience mode may be provided. For example, there may be a first high resilience mode for certain types of critical code sequences, where a particular subset of components have their usage altered in a particular way, and there may be a separate high resilience mode of operation for other critical code sequences, where the actual subset of components and/or the change in behaviour of those components is different to the subset of components and/or change in behaviour associated with the first high resilience mode. However, for the purpose of the following discussion, it will be assumed that there is a single high resilience mode of operation, and a default mode of operation, and that a particular subset of components have their behaviour modified dependent on whether the processing circuitry is operating in the default mode of operation or the high resilience mode of operation.

Figure 3:
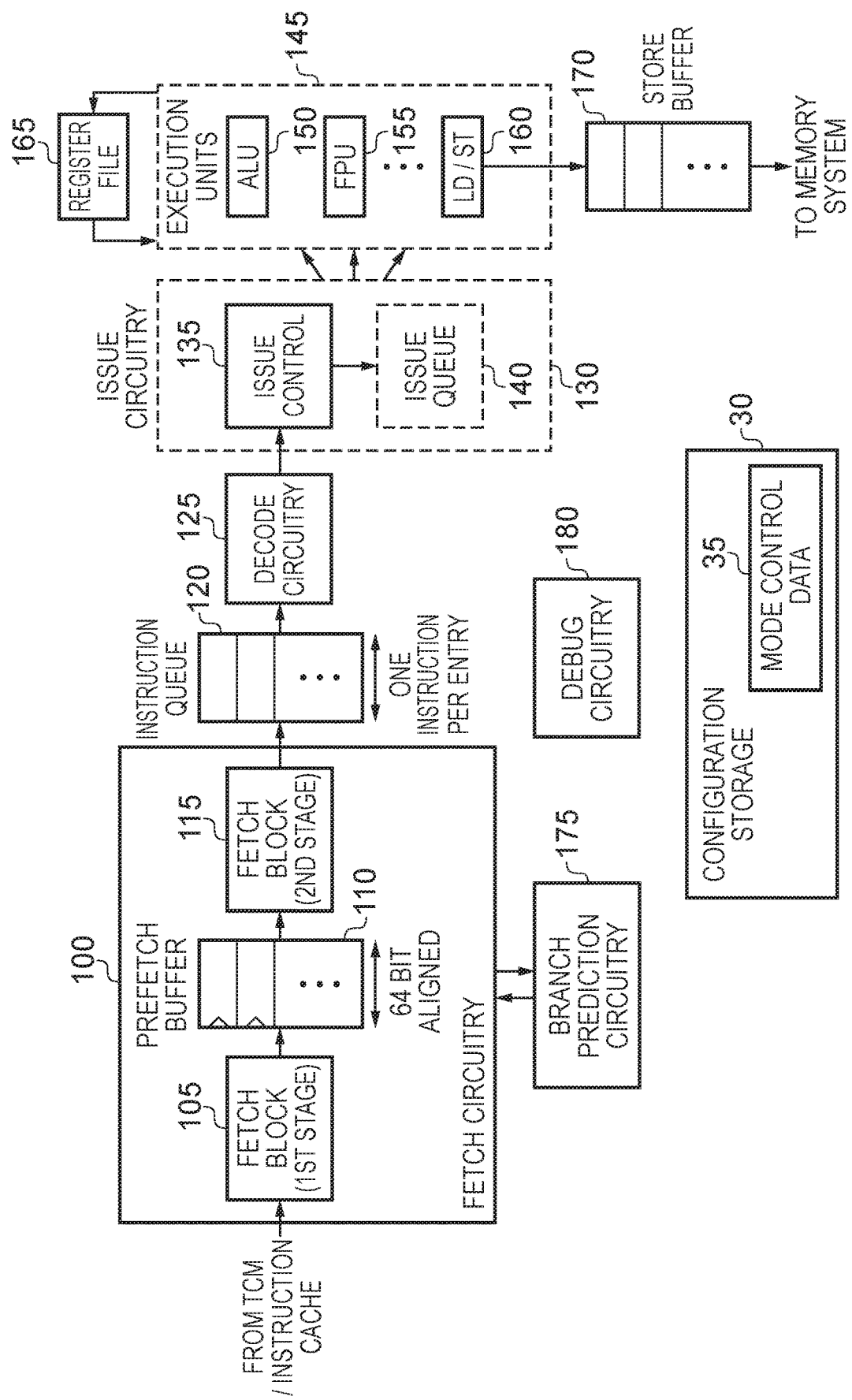
FIG. 3 is a block diagram illustrating in more detail components provided within the apparatus in accordance with one embodiment.

FIG. 3 is a block diagram showing in more detail components provided within the processing circuitry in accordance with one embodiment. Fetch circuitry 100 is provided for fetching instructions from memory. In particular, a fetch block 105 within the fetch circuitry may be responsible for interfacing with the memory system in order to retrieve blocks of instruction data from the memory system. The fetch block 105 may be arranged to access an instruction cache and/or the TCM in order to retrieve instruction blocks containing the required instructions. The fetch block 105 accesses chunks of information aligned with the memory access bandwidth, and accordingly in one embodiment may retrieve 64-bit aligned blocks of instruction information, with those blocks being stored within entries of the prefetch buffer 110. However, the instructions themselves may be specified in smaller sequences of bits, for example 32-bit instructions or 16-bit instructions. The second stage fetch block 115 is responsible for extracting the actual instructions required from the blocks of instruction information stored within the prefetch buffer 110, with those instructions then being stored within the instruction queue 120, where each entry in the instruction queue holds one instruction.

The fetch circuitry 100 will typically maintain a program counter value, and will use that information when determining the next block of instruction information to be retrieved from memory. To assist the fetch circuitry in determining what instruction information to retrieve from memory, branch prediction circuitry 175 may be used to seek to predict when changes in instruction flow will occur. For example, for a branch instruction, the branch prediction circuitry may provide a prediction as to whether the branch specified by that branch instruction will be taken or not taken, and may also be able to provide a prediction as to the target address if the branch is taken, thereby assisting the fetch circuitry in determining the next address in memory to be accessed when retrieving instruction information for storage in the prefetch buffer 110.

Decode circuitry 125 is arranged to retrieve the instructions from the instruction queue and to decode those instructions in order to produce control information issued to the issue circuitry 130. The issue circuitry 130 will include issue control circuitry 135 used to issue the decoded instructions to the relevant execution unit within the block of execution units 145. A variety of execution units may be provided, for example an arithmetic logic unit 150, a floating-point unit 155, a load/store unit 160, etc. The issue control circuitry 135 will issue each decoded instruction to the relevant execution unit dependent on the type of operation needing to be performed in order to execute that instruction.

In some implementations, the issue circuitry 130 may also include an issue queue 140. For example, in an out-of-order processor, an issue queue (also sometimes referred to as a dispatch queue) may be used to store multiple pending decoded instructions for each type of execution unit, with the individual execution units then being able to retrieve decoded instructions from the associated portion of the issue queue, allowing those execution units to perform some re-ordering of the instructions executed by them.

As shown in FIG. 3, the execution units 145 will typically have access to a register file 165 containing a plurality of working registers in which data values manipulated by the execution units can be stored.

The load/store unit 160 is used to load data from the memory system into registers of the register file 165, or to store data from registers of the register file back to the memory system. One or more intervening buffers may be provided between the load/store pipeline 160 and the memory system, such as the store buffer 170 shown in FIG. 3. In particular, when processing store operations, the load/store unit 160 may place the required information about the store operation into an entry of the store buffer 170, at which point the load/store unit may receive an acknowledgement signal from the store buffer. This allows the processing circuitry to continue execution beyond the associated store instruction, whilst leaving the store buffer 170 to communicate with the memory system in due course to cause the store operation to be performed.

As shown in FIG. 3, certain other components may also be provided within the processing circuitry, and may interact with the processing pipeline shown in FIG. 3 in certain situations. For example debug circuitry 180 can be provided for use when performing debug operations in respect of the processing pipeline.

Whilst in the example of FIG. 3 it will be appreciated that there are certain key components that are required to ensure correct execution of instructions, for example the fetch blocks 105, 115, the decode circuitry 125, the issue control circuitry 135, the execution units 145, and the register file 165, there are also certain other components that are not strictly required for correct execution. These may for example include components such as the branch prediction circuitry 175 and the debug circuitry 180, and may also include one or more of the buffer/queue structures 110, 120, 140, 170. In accordance with the embodiments described herein, one or more of these latter components can have their usage modified when the processing circuitry is operating in the high resilience mode of operation, with the aim of increasing the overall resilience to faults of the processing circuitry.

Figure 4A:
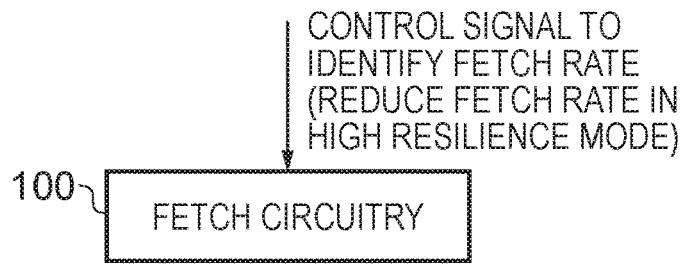
FIGS. 4A to 4D schematically illustrate various mechanisms that may be employed within the described embodiments to increase resilience to faults within the apparatus.

FIGS. 4A to 4D illustrate examples of how such components can have their usage modified in the high resilience mode of operation. As shown in FIG. 4A, when the mode control data 35 indicates the high resilience mode of operation, this may be used to generate a control signal to the fetch circuitry 100 that identifies a fetch rate to be used by the fetch circuitry that is reduced relative to the fetch rate that would be used by the fetch circuitry when in the default mode of operation. As a result, this will increase the relative amount of time that the instructions remain within the ECC protected memory system, and conversely reduce the amount of time the information derived from those instructions is present within the internal structures of the processing circuitry. Whilst the processing circuitry is still susceptible to faults incurred by external events such as particle strikes, if the instructions (and the associated data) can spend less time within the processing pipeline, and a greater proportion of time within the ECC protected memory system, this increases the overall resilience of the processing circuitry to such faults, by reducing the likelihood that such faults will occur whilst the critical code sequence is being executed in the high resilience mode of operation.

It is also possible that by reducing the fetch rate certain of the buffer/queue structures will be less utilised, and accordingly less of their entries will contain active information that is being used by the processing circuitry. Accordingly, faults that arise within those non-active elements will not manifest themselves in errors during performance of the processing operations within the processing pipeline, thus also further improving resilience of the processing circuitry to faults.

For some types of code sequences, it is possible that a reduction in the fetch rate could cause a significant degradation in performance, which might itself negate the potential fault resilience improvements obtainable. In particular, if the performance is significantly impacted, the instructions may still spend a significant period of time within the processing pipelines even though the fetch rate has been reduced. However, it has been found that there are many types of code sequences where it is highly desirable to reduce occurrence of errors (and hence that can be considered critical code sequences), and where a reduction in fetch rate does not have a significant impact on performance. In particular, many such code sequences involve significant numbers of data load and store accesses performed through the load/store unit 160, where the performance of those load and store operations accounts for a very significant proportion of the overall number of clock cycles taken to perform the critical code sequence. Accordingly, reducing the fetch rate does not significantly alter performance. Further, it is often the case that those code sequences involve relatively few or no branch instructions, and hence have a very predictable instruction flow. As a result, there is less need for significant buffering of instructions within the processing pipeline to smooth out the instruction flow. Particular examples of code sequences that exhibit such characteristics are memory scrubbing, check-pointing and resynchronisation routines, and examples of these routines will be discussed in more detail later.

Figure 4B:
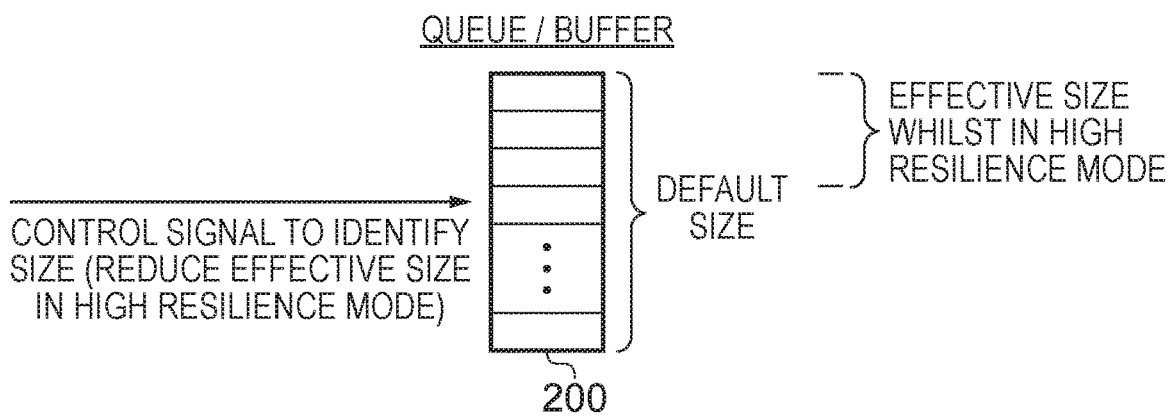

FIG. 4B illustrates another example way in which certain components can have their usage modified whilst the processing circuitry is in the high resilience mode of operation. In particular, each of the queues/buffers shown in FIG. 3, in particular the prefetch buffer 110, instruction queue 120, issue queue 140 and store buffer 170 may be provided with a default number of entries, any of which can be used whilst the processing circuitry is operating in the default mode of operation. Such a generic queue/buffer is shown by the element 200 in FIG. 4B. However, when the mode control data 35 is set to identify the high resilience mode of operation, this can result in the generation of a control signal to such a buffer identifying a reduced size to be used whilst the processing circuitry is in the high resilience mode. Hence, when in the high resilience mode, only a subset of the available entries will be actually available for use, hence reducing the effective size of the queue/buffer. This enables an improved resilience to faults since, whilst structurally the buffer still contains the same number of entries, only a reduced number of those entries will actually store live information being used by the processing circuitry whilst in the high resilience mode of operation. Hence, any particle strikes that cause faults in any of the unused entries will not have the potential to cause associated errors in the data being processed by the processing circuitry, and accordingly the resilience to such faults is improved.

In one embodiment, the reduction in the effective size of one or more of the queues/buffers can be taken as a separate step to any reduction in fetch rate of the fetch circuitry. However, in an alternative embodiment, for example where the fetch rate may not be able to be altered directly, a reduction in the size of one or more of the buffers may itself cause a reduction in the fetch rate. For example, if the number of entries in the prefetch buffer 110 are reduced, then this increases the likelihood that the prefetch buffer will become full, and when the prefetch buffer is full the fetch block 105 will be stalled from fetching further instruction blocks from memory, until a free entry becomes available within the prefetch buffer. Hence, reducing the effective size of certain buffers can directly bring about a reduction in the fetch rate.

Figure 4C:
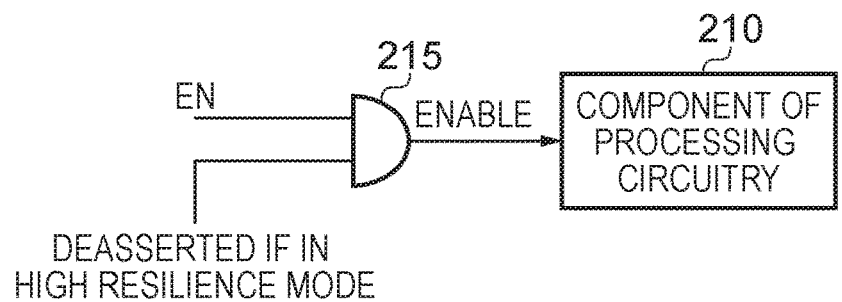

As shown in FIG. 4C, certain components 210 of the processing circuitry may be enabled or disabled dependent on whether the processing circuitry is operating in the default mode of operation or the high resilience mode of operation. In particular, as illustrated schematically by the AND gate 215, the enable signal can be gated by a further signal, with that further signal being deasserted if the processing circuitry is in the high resilience mode of operation, thereby deasserting the enable signal to the component 210. This could for example be used to disable the debug circuitry 180 whilst in the high resilience mode of operation to prevent debug operations being performed when the processing circuitry is in that mode of operation. This prevents the chance that components that are subjected to a fault condition within the debug circuitry could propagate information into the processing pipeline that then manifests as errors. If desired, the branch prediction circuitry 175 could also be disabled in such a manner.

Figure 4D:
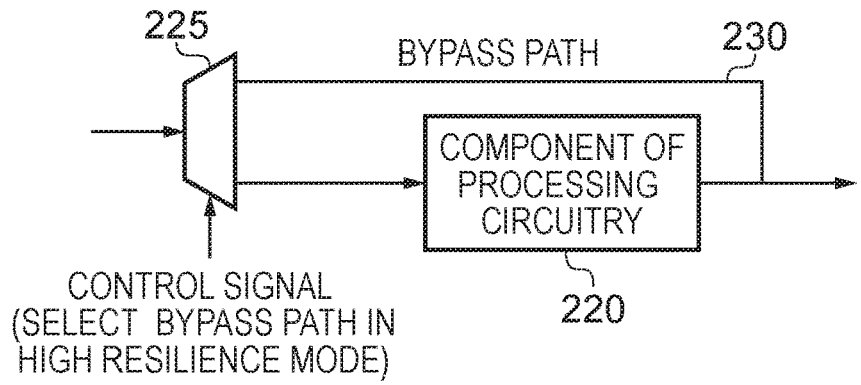

As an alternative to disabling a component, bypass paths may be provided and activated, as shown in FIG. 4D. Hence, a component 220 can have an associated bypass path 230, with the demultiplexer 225 being controlled by a control signal that is derived from the mode control data 35, hence allowing signals to be routed to the component 220 or instead to be routed via the bypass path 230. As a result, when the processing circuitry is in the high resilience mode of operation, certain components 220 can be bypassed if desired. Hence, if any element within the component 220 is subjected to a fault, that fault cannot contribute to the generation of errors whilst the processing circuitry is operating in the high resilience mode of operation, due to the component 220 being bypassed whilst the processing circuitry is in the high resilience mode of operation.

In one embodiment, the critical code sequence that is executed by the processing circuitry whilst in the high resilience mode of operation can take the form of a memory scrubbing operation. The objective of memory scrubbing is to prevent the accumulation of errors in ECC-protected memories, and consists in periodically reading the memory contents and writing them back. As part of the process of reading the memory contents, any single error in a data value may be automatically corrected by the ECC logic, and hence the data written back is correct. However, if too many errors accumulate, it may no longer be possible to correct those errors using the ECC information, and accordingly it is beneficial to periodically perform the memory scrubbing operation.

Figure 5:
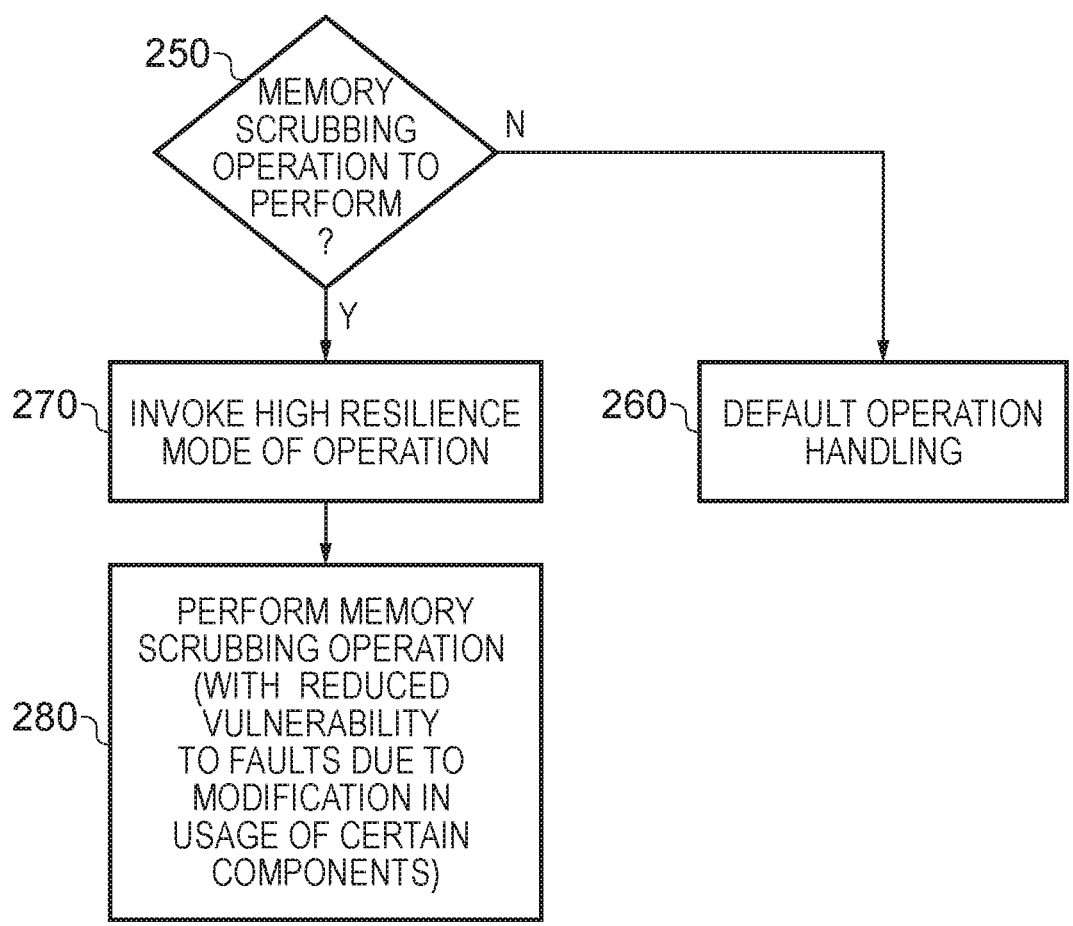
FIG. 5 is a flow diagram illustrating performance of a memory scrubbing operation in accordance with one embodiment.

However, it is highly desirable that the processing circuitry is not subjected to a fault whilst performing the memory scrubbing operation, in situations where that fault can itself introduce an error into the data being scrubbed, as this could cause memory corruption. Accordingly, as shown in FIG. 5, in one embodiment memory scrubbing operations are performed by the processing circuitry whilst in the high resilience mode of operation. In particular, at step 250 it is determined whether a memory scrubbing operation is to be performed, and if not the operation is handled in the default manner at step 260. However, if it is determined that a memory scrubbing operation is to be performed, then the high resilience mode of operation is invoked at step 270. This will involve setting the mode control data 35, so as to invoke one or more of the mechanisms illustrated schematically with reference to FIGS. 4A to 4D in respect of certain components of the processing circuitry. Thereafter, at step 280, the memory scrubbing operation is performed. Due to the change in usage of one or more components of the processing circuitry that occurs when in the high resilience mode of operation, the processing circuitry has reduced vulnerability to faults, since there is a reduced chance that a fault within the processing circuitry will manifest itself in an error in the data being processed during the memory scrubbing operation. This hence reduces the probability of memory corruption whilst executing the memory scrubbing operation.

Another type of operation that may suitably be treated as a critical code sequence executed by the processing circuitry in the high resilience mode of operation is a check-pointing operation. Check-pointing operations involve periodically saving the architectural state of a running program (i.e. the registers and memory) so that if in due course an error is detected, the program execution can be rolled back to the last saved correct check-pointed state, with the execution resuming from that check-point. However, if errors are introduced into the state information saved to memory, then that version of the check-pointed state cannot be used, and it may be necessary to rollback to earlier check-pointed states when resuming execution.

Figure 6:
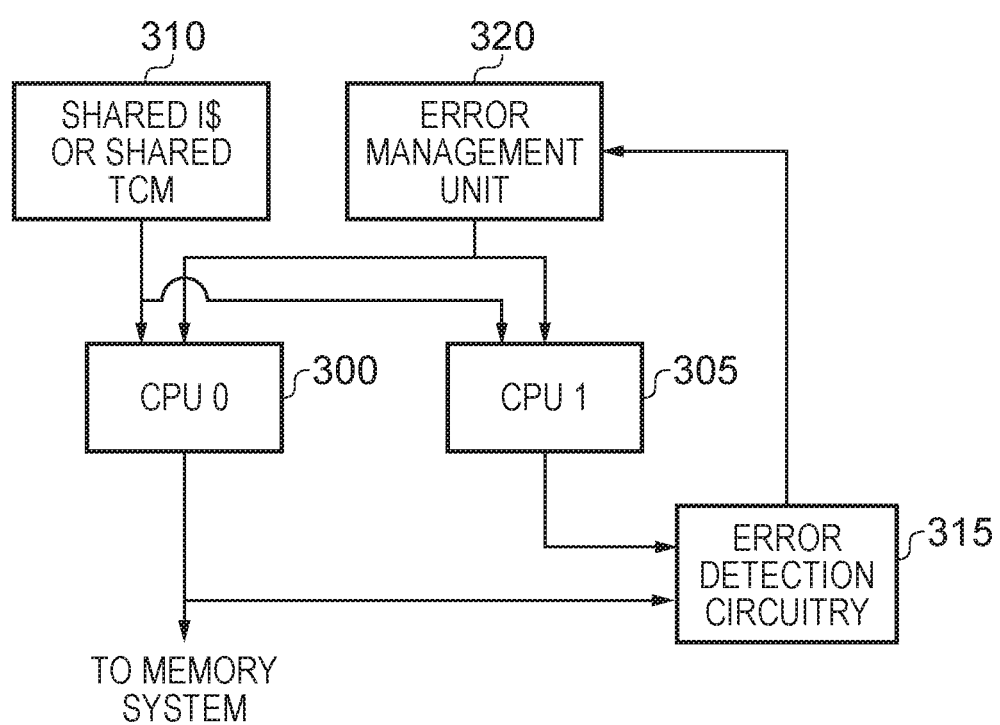
FIG. 6 is a block diagram illustrating a dual core lockstep processing apparatus in accordance with one embodiment.

One example scenario where such check-pointing can beneficially be performed in a high resilience mode of operation is in an apparatus where two processors are arranged to operate in lockstep, and shown in FIG. 6. In particular, the CPU 300 and the CPU 305 are arranged to perform redundant execution of a sequence of instructions retrieved from a shared instruction cache or a shared TCM 310. The CPU 300 is coupled to the memory system, and is considered to be the main processor. However, the output from the CPU 300 is compared with the output from the CPU 305 by the error detection circuitry 315. Whenever there is a discrepancy in the outputs from the two processors, the error detection circuitry 315 will detect an error condition, and send an error detection signal to the error management unit 320. The error management unit 320 can then invoke an appropriate routine to recover from the error. It should be noted that because there are only two CPUs 300, 305, whilst an error can be detected, it cannot be detected which of the CPUs is in error. Hence, the error management unit 320 will typically need to restore processing to an earlier check-point, and begin re-running the code from that check-point.

Within the system of FIG. 6, the CPUs 300, 305 will periodically be arranged to execute check-pointing routines in order to save architectural state to memory, so that that architectural state can later be referred to if it is necessary to rollback execution following detection of an error by the error detection circuitry 315. However, if during the performance of the check-pointing routine an error is detected by the error detection circuitry 315, the state saved during that check-pointing routine will need to be discarded, since it cannot be confirmed that that state information is correct. If later on an error is detected by the error detection circuitry whilst executing other code, and the error management unit 320 decides to rollback execution to a previously stored check-point, it will be appreciated that the processors will be required to restore to an older check-point than would otherwise have been the case if an error had not been detected whilst performing the previous check-pointing routine, and hence it is necessary to execute a greater portion of the program again, thus impacting performance.

Figure 7:
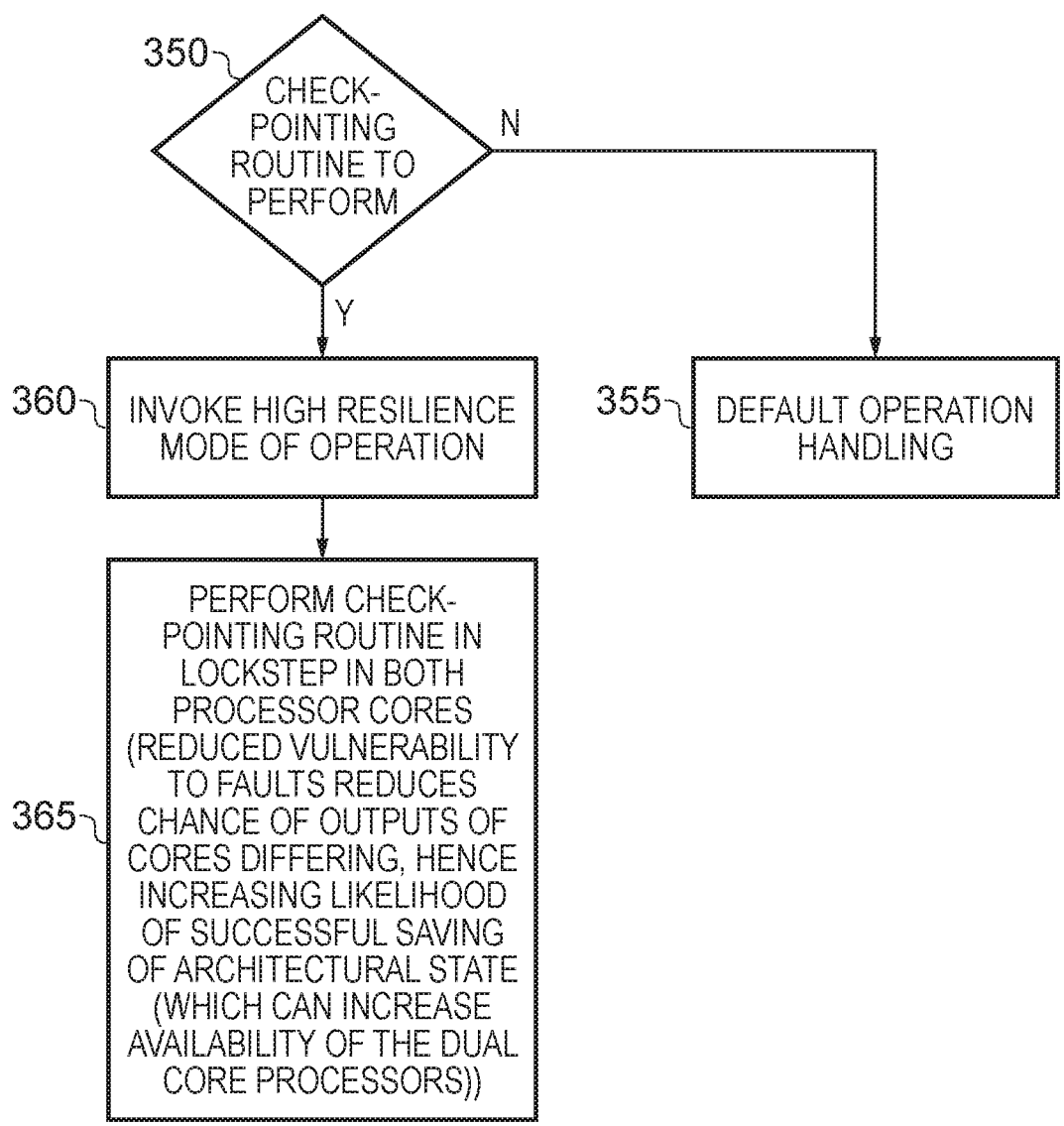
FIG. 7 is a flow diagram illustrating performance of a check-pointing routing within the apparatus of FIG. 6 in accordance with one embodiment.

Accordingly, in one embodiment the processors 300, 305 are arranged to execute the check-pointing routine whilst in the high resilience mode of operation, so as to reduce the chance of an error occurring whilst performing the check-pointing routine, as illustrated schematically in FIG. 7. In particular, at step 350 it is determined whether a check-pointing routine needs to be performed, and if not default operation handling is performed at step 355. However, if it is determined that a check-pointing routine is to be performed, then the high resilience mode of operation is invoked at step 360, whereafter the check-pointing routine is performed in lockstep in both processor cores 365. The reduced vulnerability to faults within each processing circuitry whilst operating in the high resilience mode of operation reduces the chance of the outputs of the cores differing, hence increasing the likelihood of successful saving of the architectural state. This in due course can increase the availability of the dual core processors, by avoiding the need to restore to older check-points.

Another example of a critical code sequence that may be executed by processing circuitry in the high resilience mode of operation is a resynchronisation routine that may periodically be required within an apparatus that employs at least three processing circuits operating in lockstep to perform redundant processing of program instructions. By having at least three processing circuits operating in lockstep, if a difference is observed in the outputs of a minority of the processing circuits, indicating an error, then that error may be resolved using state information derived from the majority of the processing circuits (whose outputs do not differ). This process is illustrated schematically with reference to FIG. 8, which shows a triple core lockstep (TCLS) apparatus.

Figure 8:
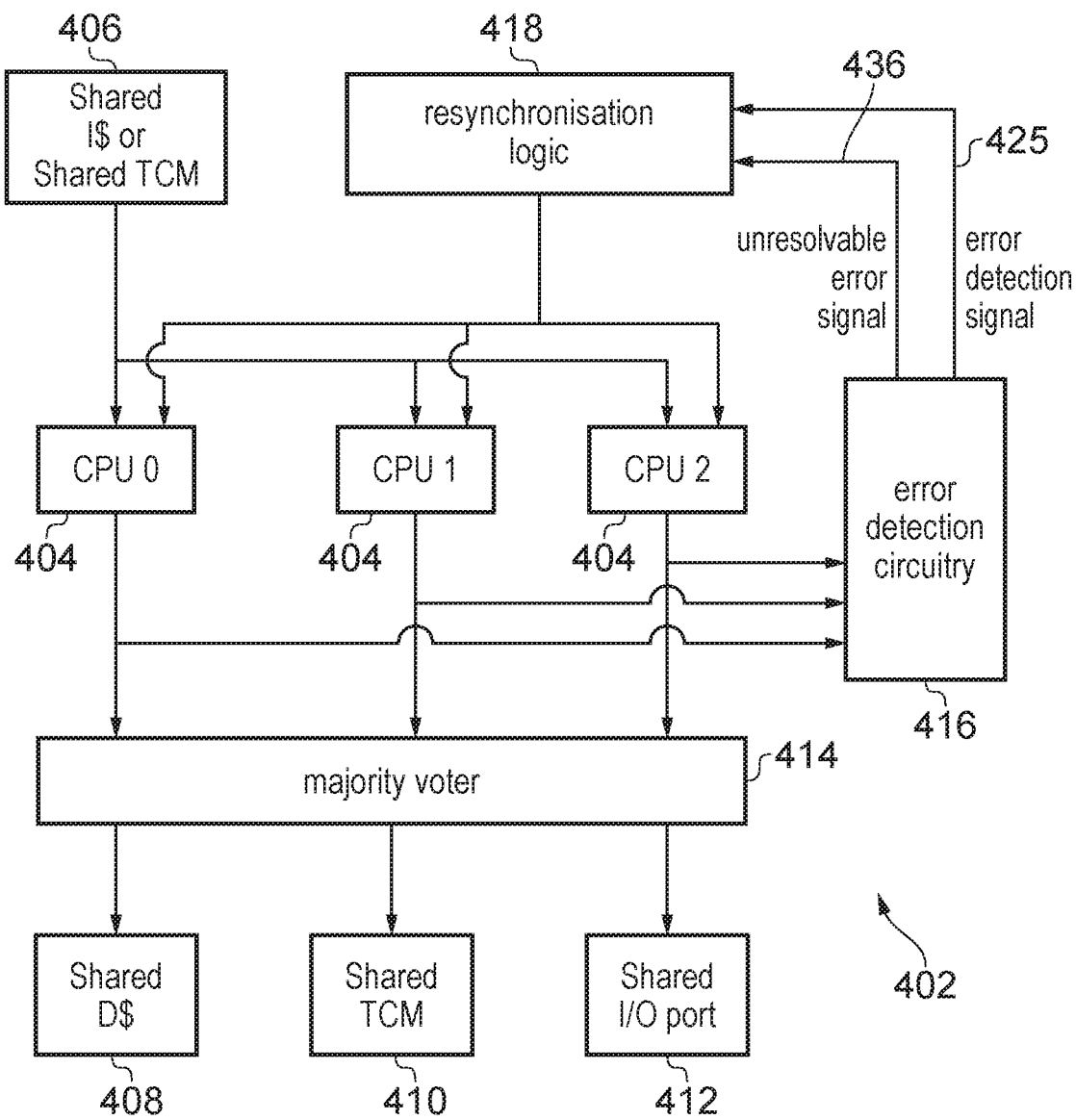
FIG. 8 schematically illustrates a triple core lockstep processing apparatus in accordance with one embodiment.

FIG. 8 schematically illustrates an example of a data processing apparatus 402 with triple core lockstep protection against errors. The apparatus 402 has three processors 404 for performing redundant processing of a common thread of program instructions. The three processors 404 can be placed in physically separated locations in an integrated circuit, to reduce the chance that an error affecting one processor 404 also affects another processor. The processors 404 share an instruction cache 406 which stores the instructions to be executed by the processors 404, as well as a shared data cache 408 and tightly coupled memory 410 for storing data processed by the processors 404, and a shared input/output (I/O) port 412 for communicating with peripheral devices. The TCM may also store some instructions to be executed by the processors, as denoted by the box 406 in FIG. 8. As the shared storage circuits 406, 408, 410 are not triplicated, the data/instructions stored in these units may be protected using error detecting or correcting codes (e.g. parity codes, cyclic redundancy checks, checksums, block codes, etc.), which provide some redundant information to allow for at least detection of errors caused by SEUs in the storage circuits (and optionally correction of the errors too). The outputs of the processors 404 are passed to majority voter circuitry 414 which selects, as the output to be passed to the shared data cache 408, TCM 410 or I/O port 412, the value generated by a majority of the processors 404, i.e. at least two of the processors. Also, the outputs of the processors are passed to error detection circuitry 416 which compares the outputs and detects an error when two or more of the processors generate different results. Resynchronisation logic 418 is provided for triggering a recovery process for recovering from errors if it receives an asserted error detection signal over path 425.

Hence, at each clock cycle, the instructions to execute are read from the shared instruction cache 406 or the TCM 410, and distributed to the triplicated processors (CPUs) 404. The CPU outputs are majority-voted and forwarded to the shared data cache 408, TCM 410, and I/O ports 412. Simultaneously, the error detection logic 416 checks if there is any mismatch in the outputs delivered by the three CPUs 404. If there is a mismatch, all CPUs are interrupted and the error detection logic 416 identifies whether it is a correctable error (only one of the CPUs delivers a different set of outputs) or an uncorrectable error (all CPUs deliver different outputs). If the error is correctable, the resynchronization logic 418 corrects the architectural state of the erroneous CPU 404, that is, resynchronizes all the CPUs. In the unlikely case that the error is uncorrectable, the system transitions to a fail-safe operation state. Note here that the majority voter circuitry 414 acts as an error propagation boundary, preventing uncorrectable errors from propagating to memories 408, 410 and I/O ports 412. While the majority voter circuitry 414 is on the critical path of the system 402, it is made from combinational logic which is relatively fast. The error detection logic 416 is out of this critical path and may be pipelined to increase performance.

When a correctable (resolvable) error is detected, the resynchronisation (recovery) process can be triggered immediately, or could wait for software to start it in response to the CPU interrupt. Delaying the start of the resynchronisation process can sometimes be useful to prevent the interruption of critical real-time tasks. Note that when an error is detected in one CPU 404, the system can still work safely with the two remaining CPUs, which are in a functionally correct state. In fact, the correct architectural state to be restored in the erroneous CPU is recovered from these two CPUs in the recovery process. This is done by issuing an interrupt to the CPUs 404, which flushes their pipelines and pushes out their architectural state (e.g. register files, program counter and state registers) to a storage device, such as the cache 408 or TCM 410. The CPU architectural states are passed through the majority voter circuitry 414, and may be stored in a program stack mapped to the ECC-protected TCM 410, for example. At the end of the interrupt handler which performs the state saving, the CPUs enters a Wait for Event (WFE) low-power standby mode. When the resynchronization logic 418 observes the WFE signal, it issues a reset to the three CPUs 404 to scrub away any soft error that might exist in their micro-architecture registers. This reset also wakes up the CPUs from the standby mode, initiating the restoration of the architectural state that was previously pushed onto the program stack. The last register to be restored is the program counter, thus resuming the normal operation of the CPUs at the same point in the code where it was suspended to launch the resynchronization process. The recovery process initiated by the resynchronization logic 418 is automatic and transparent to the software.

Figure 9:
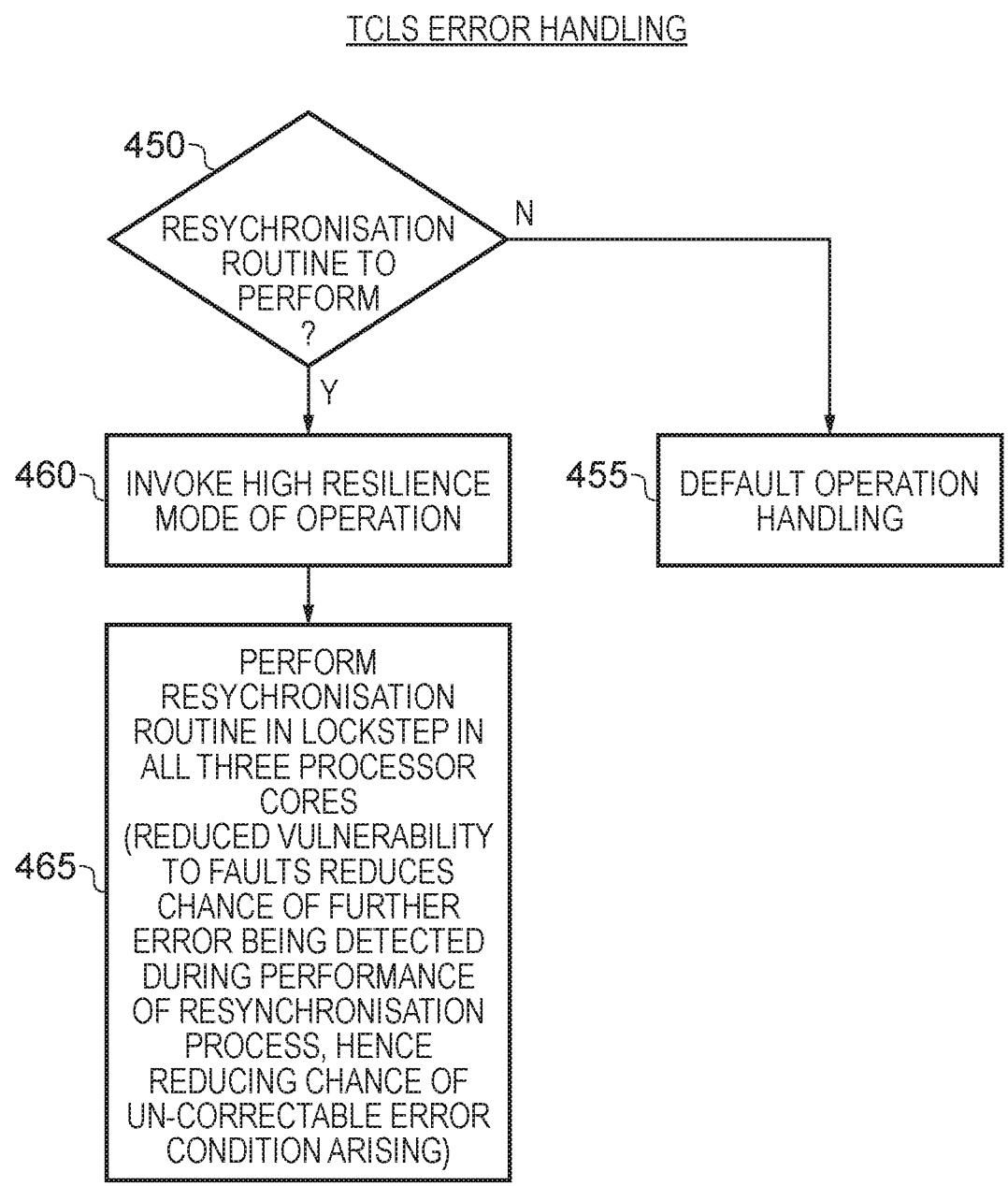
FIG. 9 is a flow diagram illustrating performance of a resynchronisation routine within the apparatus of FIG. 8 in accordance with one embodiment.

If during the resynchronisation process, the error detection circuitry 416 detects a further error, this time in relation to the two cores that were not previously in error, it at that point will issue an unresolvable error signal over path 436 which causes the resynchronisation logic 418 to suspend the resynchronisation process and trigger entry to a failsafe state, exit from which may require a full system reboot and pipeline flush. It is hence highly desirable to reduce the likelihood of an unresolvable error being detected whilst performing the resynchronisation process. Accordingly, in one embodiment, as indicated in FIG. 9 the resynchronisation routine is executed by the processing circuits whilst they are in the high resilience mode of operation. In particular, at step 450 it is determined whether a resynchronisation routine needs to be performed, and if not default operation handling is performed at step 455. However, if the resynchronisation routine is to be performed, the high resilience mode of operation is invoked at step 460 within each of the processors 404, whereafter the resynchronisation routine is performed in lockstep in all three processor cores. Due to the reduced vulnerability to faults within the processing circuits whilst they are operating in the high resilience mode of operation, the chances of the outputs differing, resulting in detection of a further error by the error detection circuitry 416, is reduced, and hence the chance of an uncorrectable error condition arising is reduced.

In one embodiment, in addition to triggering the resynchronisation process on detection of an error by the error detection circuitry 416, the resynchronisation routine can also be initiated periodically to purge dormant faults in the CPUs, i.e. to perform preventative scrubbing.

Whilst in one embodiment shown in FIG. 8, the instructions executed by the various CPUs are retrieved from a shared instruction cache, in one embodiment the resynchronisation routine is stored within the shared TCM 410, along with any associated data required when implementing that resynchronisation routine. As a result, the resynchronisation routine can be retrieved directly from the TCM, bypassing one or more levels of cache. The interface with the TCM is typically less complex than the interface to cache, and accordingly the latency involved in retrieving the instructions and data can be reduced. Further, the chances of faults being introduced during the retrieval process can also be reduced, hence further improving robustness to faults.

This mechanism of storing the critical code and associated data within TCM can also be employed in any of the other embodiments described where a TCM memory is provided for the processing circuit(s).

From the above described embodiments, it will be appreciated that such embodiments increase the resilience of a CPU pipeline to faults when executing high criticality routines. Examples of such routines that can benefit from the described approach include CPU resynchronisation in a TCLS processor system, check-pointing in a single core or a dual core lockstep processor, and memory scrubbing in any type of processor, including single core processors. However, it will be appreciated that other forms of critical code sequences could also benefit from being performed in the high resilience mode of operation described herein.

The high resilience mode is based on two principles, firstly keeping the instructions and data in ECC-protected memory (such as TCM) for the longest possible time without adversely impacting performance, and secondly bypassing, disabling, or reducing the utilisation of structures in the CPU pipeline that are not strictly necessary when executing the high criticality routines.

It has been found that by using the techniques described herein, a significant increase in resilience of the processing circuitry to faults can be realised, which can significantly reduce the occurrence of errors when performing critical code sequences. Further, it has been found that the changes in utilisation of certain components adopted to increase the resilience to faults can be made without adversely affecting the performance of the required critical code sequences.

Figure 10:
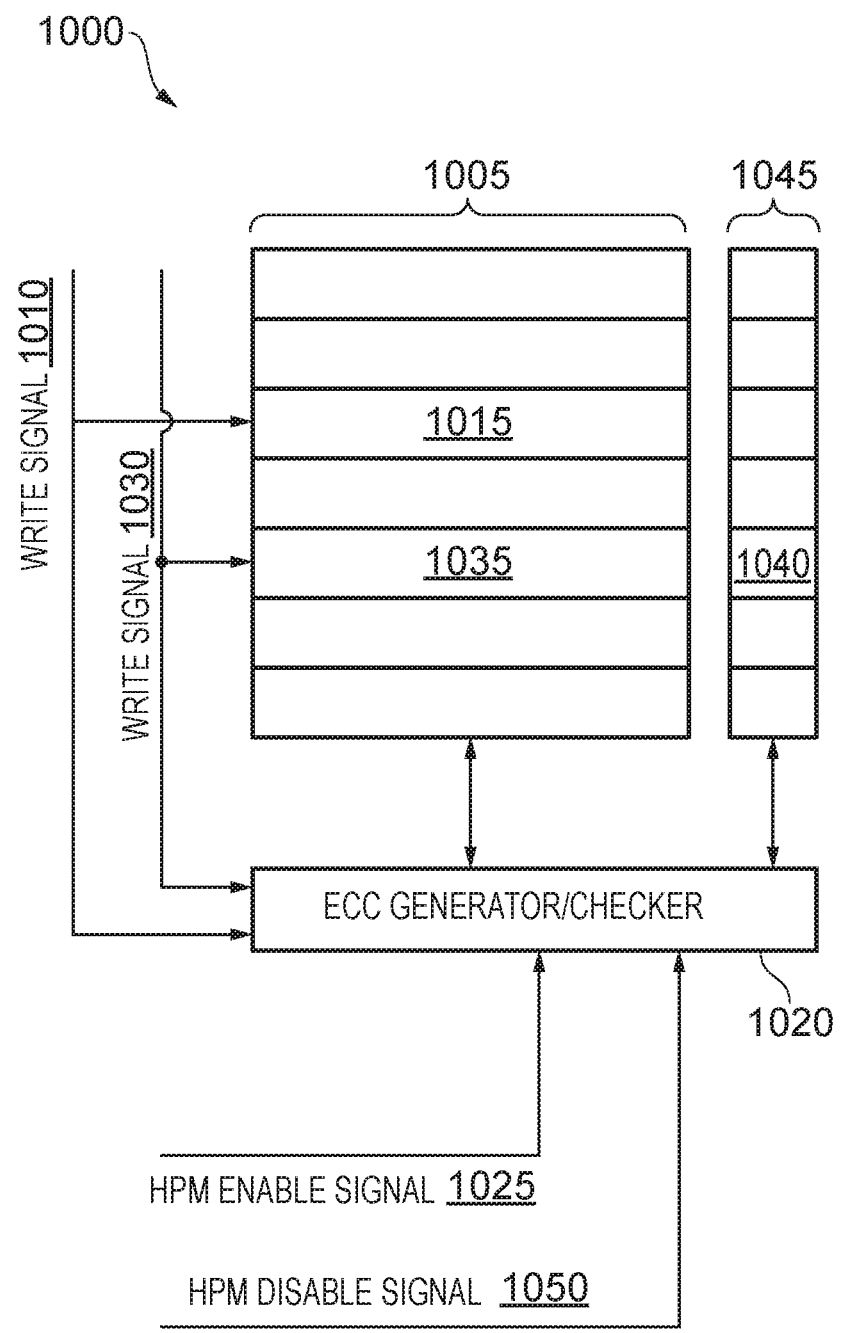
FIG. 10 schematically illustrates an example in accordance with one embodiment.

FIG. 10 schematically illustrates an apparatus 1000 according to aspects of the present disclosure. The apparatus includes a storage structure 1005 for storing data items on which data processing operations can be performed. For example, the storage structure 1005 may be a microarchitecture storage structure within a central processing unit.

A write signal 1010 is received, indicating a value to be written to a storage element 1015 of the storage structure 1005. The write signal 1010 is also provided to an error correcting code (ECC) generator/checker 1020. When operating in a default mode of operation, the ECC generator/checker 1020 takes no further action.

When a high resilience mode (HRM) enable signal 1025 is received by the ECC generator/checker 1020, the apparatus 1000 enters a high resilience mode of operation. Subsequently, a write signal 1030 is received, indicating a value to be written to a storage element 1035 of the storage structure 1005. As for the write signal 1010, the write signal 1030 is also provided to the ECC generator/checker 1020.

As a consequence of the apparatus 1000 operating in the high resilience mode, the ECC generator/checker 1020 generates an ECC corresponding to the value of the write request 1030. This ECC is stored in an ECC storage element 1040 of an ECC storage structure 1045 associated with the storage structure 1005.

When the data value is subsequently read from ECC storage element 1040, the ECC generator/checker 1020 checks the value against the ECC. If an error is detected, an error mitigation action can be taken, for example signalling an error. Otherwise, processing proceeds based on the read data value.

If data is read from storage element 1015, no corresponding ECC is available and so no error checking is performed. However, over time as an ECC is stored for each newly written data item, most or all data items in the storage structure 1005 will have an associated ECC in the ECC storage structure 1045.

At a subsequent time, a HRM disable signal 1050 is received at the ECC generator/checker 1020. Upon receipt of the HRM disable signal 1050, the apparatus 1000 exits the high resilience mode of operation and generation of ECCs ceases. However, in some implementations the ECC generator/checker 1020 continues checking of ECCs for stored values for which an ECC is available. The ECC generator/checker 1020 and ECC storage structure 1045 are then deactivated after all storage elements of the storage structure 1005 have been overwritten, such that no ECCs are stored in the ECC storage structure 1045.

In alternative implementations, upon receipt of the HRM disable signal 1050 all stored ECCs are invalidated and the ECC generator/checker 1020 and ECC storage 1045 are immediately deactivated.

The presently described example thus provides power-efficient error detection and protection techniques, which can be dynamically enabled and disabled at run-time.

Whilst the above described techniques have been illustrated with regards to various concrete examples, it will be appreciated that the technique can also be of benefit in other applications too, such as in connection with the performance of certain code sequences by hypervisor software in the context of virtualised safety applications. For example, in a mixed-criticality system where various pieces of code of different criticality levels run on the same processor, certain critical code sequences (which may be different to the specific examples discussed earlier herein) could be executed using the high-resilience mode of operation described herein, while other less critical routines could be executed using the standard CPU execution mode.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

Aspects of the present disclosure are set out in the following numbered clauses:

1. An apparatus comprising:
    processing circuitry to execute a plurality of code sequences including at least one critical code sequence; and
    configuration storage to store mode control data for the processing circuitry;
    when the processing circuitry is executing said at least one critical code sequence, the mode control data is set so as to identify a high resilience mode of operation of the processing circuitry where usage of one or more components of the processing circuitry is modified so as to increase resilience of the processing circuitry to faults relative to a default mode of operation of the processing circuitry.

2. An apparatus according to Clause 1, wherein:
    the processing circuitry comprises a first subset of components required for correct execution of instructions of each code sequence, and a second subset of components whose usage is unnecessary for correct execution of said instructions; and
    the one or more components whose usage is modified when the processing circuitry is in the high resilience mode comprise components within said second subset.

3. An apparatus according to Clause 2, wherein one or more of the components in said second subset are provided to seek to improve performance of the processing circuitry.

4. An apparatus according to Clause 2, wherein the modification in the usage of the one or more components when the processing circuitry is in said high resilience mode comprises one of:
    bypassing the component;
    decreasing an extent to which the component is used;
    disabling the component.

5. An apparatus according to Clause 1, wherein:
    the processing circuitry comprises fetch circuitry to fetch the instructions of each code sequence from a memory system prior to execution of those instructions, the memory system employing an error detection scheme; and
    when in the high resilience mode of operation, usage of the fetch circuitry is modified to cause the fetch circuitry to reduce a fetch rate relative to a fetch rate used when the processing circuitry is in the default mode of operation.

6. An apparatus according to Clause 5, wherein:
    said one or more components comprise at least one buffer structure used to buffer information derived from the fetched instructions prior to execution of the instructions; and
    when in the high resilience mode of operation, the usage of said at least one buffer structure is modified to reduce an effective size of the at least one buffer structure relative to the effective size when in the default mode of operation, to thereby reduce the fetch rate of the fetch circuitry.

7. An apparatus according to Clause 1, wherein:
    the modification in the usage of said one or more components of the processing circuitry takes into account at least one characteristic of the critical code sequence, such that an impact on performance of the processing circuitry when executing the critical code sequence in the high resilience mode of operation is less than a first threshold.

8. An apparatus according to Clause 7, wherein said at least one characteristic comprises at least one of:
    a proportion of memory access instructions above a second threshold;
    a proportion of branch instructions below a third threshold;
    such that a reduction in a fetch rate of instructions by fetch circuitry of the processing circuitry has an impact on performance less than said first threshold.

9. An apparatus according to Clause 1, wherein:
    the processing circuitry is arranged to be coupled to a memory system that employs an error detection scheme;
    the memory system comprises a first memory within which at least one of the critical code sequence and data used by the critical code sequence is stored, the processing circuitry being arranged, when executing the critical code sequence, to directly access the first memory bypassing at least one cache memory of the memory system, said at least one cache memory including one or more components unprotected by the error detection scheme.

10. An apparatus according to Clause 9, wherein the first memory is a tightly coupled memory (TCM).

11. An apparatus according to Clause 1, wherein the processing circuitry is arranged to be coupled to a memory system that employs an error detection scheme, further comprising:

data access buffer circuitry to buffer data access operations to be performed within the memory system; and when in the high resilience mode of operation, the usage of said data access buffer circuitry is modified to reduce a latency of the data access buffer circuitry relative to its latency when in the default mode of operation.

12. An apparatus according to Clause 11, wherein the latency is reduced by reducing an effective size of the data access buffer circuitry relative to the effective size when in the default mode of operation.

13. An apparatus according to Clause 1, wherein:

the processing circuitry is coupled to a memory system that employs an error detection scheme;

the critical code sequence is a memory scrubbing routine executed to read content from the memory system, correct any identified faults that are correctable in accordance with the error detection scheme, and then rewrite the content back to the memory system, thereby seeking to prevent accumulation of faults within the memory system.

14. An apparatus according to Clause 13, wherein the error detection scheme is an error correction code (ECC) scheme.

15. An apparatus according to Clause 1, wherein:

the processing circuitry is coupled to a memory system that employs an error detection scheme;

the critical code sequence is a check-pointing routine executed to save to the memory system architectural state of a program being executed by the processing circuitry, to allow rollback to that saved architectural state on detection of an error within the processing circuitry.

16. An apparatus according to Clause 15, further comprising:

at least one further processing circuitry arranged to operate in lockstep with the processing circuitry to provide redundant processing of program instructions; and when performing the check-pointing routine, both the processing circuitry and the at least one further processing circuitry are placed in the high resilience mode of operation to reduce probability of an error being detected during performance of the check-pointing routine.

17. An apparatus according to Clause 1, further comprising:

at least two further processing circuitries arranged to operate in lockstep with said processing circuitry to perform redundant processing of program instructions;

error detection circuitry to detect a mismatch between signals on a corresponding signal node in said processing circuitry and said at least two further processing circuitries;

wherein, in response to detecting said mismatch, the error detection circuitry is configured to trigger a recovery routine for resolving an error detected for an erroneous processing circuitry using state information derived from at least two other processing circuitries;

said recovery routine forming said critical code sequence, such that said processing circuitry and said at least two further processing circuitries are operated in said high resilience mode when executing said recovery routine.

18. An apparatus according to Clause 1, wherein said one or more components comprise one or more of:

fetch circuitry;
a prefetch buffer;
an instruction queue;
an issue queue;
a store buffer;
branch prediction circuitry;
debug circuitry.

19. A method of increasing resilience to faults within an apparatus having processing circuitry for executing a plurality of code sequences including at least one critical code sequence, the method comprising:

storing in configuration storage mode control data for the processing circuitry;

during execution by the processing circuitry of said at least one critical code sequence, setting the mode control data to identify a high resilience mode of operation of the processing circuitry; and in the high resilience mode of operation, modifying usage of one or more components of the processing circuitry so as to increase resilience of the processing circuitry to faults relative to a default mode of operation of the processing circuitry.

20. An apparatus comprising:

processing means for executing a plurality of code sequences including at least one critical code sequence; and configuration storage means for storing mode control data for the processing means;

when the processing means is executing said at least one critical code sequence, the mode control data is set so as to identify a high resilience mode of operation of the processing means where usage of one or more components of the processing means is modified so as to increase resilience of the processing means to faults relative to a default mode of operation of the processing means.

We claim:

1. An apparatus comprising:

processing circuitry to execute a plurality of code sequences; and configuration storage to store mode control data for the processing circuitry;

when the processing circuitry is executing one of said plurality of code sequences, the mode control data is set so as to identify a high resilience mode of operation of the processing circuitry where usage of one or more components of the processing circuitry is modified so as to increase resilience of the processing circuitry to faults relative to resilience of the processing circuitry in a default mode of operation;

wherein the processing circuitry is configured to enter the high resilience mode of operation responsive to determining that a protection condition has been met.

2. An apparatus as claimed in claim 1, wherein the protection condition is that a protection signal has been received.

3. An apparatus as claimed in claim 1, wherein the processing circuitry is coupled to a storage structure to, responsive to the processing circuitry entering the high resilience mode of operation, activate an error detection scheme.

4. An apparatus as claimed in claim 3, wherein the error detection scheme is an error correction code (ECC) scheme.

5. An apparatus as claimed in claim 4, wherein activating the error detection scheme comprises initiating determination of an error correcting code for each of a plurality of stored items of the storage structure.

6. An apparatus as claimed in claim 5, wherein the storage structure is configured to, after the processing circuitry has exited the high resilience mode of operation, implement the error detection scheme in respect of stored items for which error correction codes are determined.

7. An apparatus as claimed in claim 5, wherein the storage structure is configured to, responsive to the processing circuitry exiting the high resilience mode of operation, invalidate the determined error correction codes.

8. An apparatus as claimed in claim 3, wherein the storage structure is configured to, responsive to the processing circuitry leaving the high resilience mode of operation, deactivate the error detection scheme.

9. An apparatus as claimed in claim 8, wherein deactivating the error detection scheme comprises ceasing determination of error correcting codes for stored items of the storage structure.

10. An apparatus as claimed in claim 1, wherein the protection condition is a failure rate condition.

11. An apparatus as claimed in claim 10, wherein the failure rate condition is that a failure rate associated with at least one component of the processing circuitry has exceeded a threshold.

12. An apparatus as claimed in claim 11, wherein the failure rate is a rate of exceptions signalled by the processing circuitry.

13. An apparatus as claimed in claim 1, wherein:
the plurality of code sequences includes at least one critical code sequence; and
said executed one of said plurality of code sequences is one of said at least one critical code sequence.

14. An apparatus as claimed in claim 13, wherein:
the processing circuitry comprises a first subset of components required for correct execution of instructions of each code sequence, and a second subset of components whose usage is unnecessary for correct execution of said instructions; and
the one or more components whose usage is modified when the processing circuitry is in the high resilience mode comprise components within said second subset.

15. An apparatus as claimed in claim 14, wherein the modification in the usage of the one or more components when the processing circuitry is in said high resilience mode comprises one of:
bypassing the component;
decreasing an extent to which the component is used;
disabling the component.

16. An apparatus as claimed in claim 1, wherein:
the processing circuitry comprises fetch circuitry to fetch the instructions of each code sequence from a memory system prior to execution of those instructions, the memory system employing an error detection scheme; and
when in the high resilience mode of operation, usage of the fetch circuitry is modified to cause the fetch circuitry to reduce a fetch rate relative to a fetch rate used when the processing circuitry is in the default mode of operation.

17. An apparatus as claimed in claim 1, wherein the processing circuitry is arranged to be coupled to a memory system that employs an error detection scheme, further comprising:
data access buffer circuitry to buffer data access operations to be performed within the memory system; and
when in the high resilience mode of operation, the usage of said data access buffer circuitry is modified to reduce a latency of the data access buffer circuitry relative to its latency when in the default mode of operation.

18. A method of increasing resilience to faults within an apparatus having processing circuitry for executing a plurality of code sequences, the method comprising:
storing in configuration storage mode control data for the processing circuitry;
when the processing circuitry is executing one of said plurality of code sequences, setting the mode control data to identify a high resilience mode of operation of the processing circuitry;
in the high resilience mode of operation, modifying usage of one or more components of the processing circuitry so as to increase resilience of the processing circuitry to faults relative to resilience of the processing circuitry in a default mode of operation; and
entering the high resilience mode of operation responsive to determining that a protection condition has been met.

19. An apparatus comprising:
processing means for executing a plurality of code sequences; and
configuration storage means for storing mode control data for the processing means;
when the processing means is executing one of said plurality of code sequences, the mode control data is set so as to identify a high resilience mode of operation of the processing means where usage of one or more components of the processing means is modified so as to increase resilience of the processing means to faults relative to resilience of the processing circuitry in a default mode of operation;
wherein the processing means is configured to enter the high resilience mode of operation responsive to determining that a protection condition has been met.

\* \* \* \* \*